(12) United States Patent
Takagi

(10) Patent No.: US 12,070,916 B2
(45) Date of Patent: Aug. 27, 2024

(54) MIXING DEVICE, BOTTLE UNIT, AND PUNCTURE REPAIR KIT

(71) Applicant: Sumitomo Rubber Industries, Ltd., Kobe (JP)

(72) Inventor: Keiji Takagi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 1 day.

(21) Appl. No.: 18/122,370

(22) Filed: Mar. 16, 2023

(65) Prior Publication Data

US 2023/0321931 A1 Oct. 12, 2023

(30) Foreign Application Priority Data

Apr. 6, 2022 (JP) ................................. 2022-063546

(51) Int. Cl.
*B29C 73/16* (2006.01)
*B01F 23/213* (2022.01)
*B01F 35/00* (2022.01)
*B29C 73/02* (2006.01)
*B29C 73/24* (2006.01)

(52) U.S. Cl.
CPC .......... *B29C 73/166* (2013.01); *B01F 23/213* (2022.01); *B01F 35/79* (2022.01); *B29C 73/02* (2013.01); *B29C 73/24* (2013.01)

(58) Field of Classification Search
CPC ....... B29C 73/166; B29C 73/02; B29C 73/24; B01F 23/213; B01F 35/79
See application file for complete search history.

(56) References Cited

U.S. PATENT DOCUMENTS

| | | | | |
|---|---|---|---|---|
| 8,016,002 | B2* | 9/2011 | Yoshida | B29C 73/166 141/38 |
| 8,226,377 | B2* | 7/2012 | Yoshida | B29C 73/166 417/151 |
| 8,342,215 | B2* | 1/2013 | Sekiguchi | B29C 73/166 141/38 |
| 8,978,716 | B2* | 3/2015 | Chou | B29C 73/166 137/511 |
| 9,254,614 | B2* | 2/2016 | Takahara | B29C 73/163 |
| 2008/0230142 | A1* | 9/2008 | Hickman | B29C 73/166 141/38 |
| 2022/0024163 | A1* | 1/2022 | Dahlke | B29C 73/166 |
| 2023/0321932 | A1* | 10/2023 | Takagi | B29C 73/166 425/12 |

FOREIGN PATENT DOCUMENTS

JP 2017-56662 A 3/2017

* cited by examiner

*Primary Examiner* — Nicolas A Arnett
(74) *Attorney, Agent, or Firm* — Birch, Stewart, Kolasch & Birch, LLP

(57) ABSTRACT

A mixing device for mixing a puncture repair liquid and compressed air includes a mixing chamber, a first inlet for supplying the compressed air to the mixing chamber, a second inlet for supplying the puncture repair liquid to the mixing chamber, and an outlet for discharging a mixture of the puncture repair liquid and the compressed air from the mixing chamber. The mixing chamber includes a deposition section for depositing agglomerates contained in the puncture repair liquid. The deposition section is provided between the second inlet and the outlet.

20 Claims, 4 Drawing Sheets

MIXING DEVICE, BOTTLE UNIT, AND PUNCTURE REPAIR KIT

RELATED APPLICATIONS

This application claims the benefit of foreign priority to Japanese Patent Applications No. JP2022-063546, filed Apr. 6, 2022, which is incorporated by reference in its entirety.

FIELD OF THE INVENTION

The present disclosure relates to a mixing device for mixing puncture repair liquid and compressed air, a bottle unit including the mixing device, and a puncture repair kit including the bottle unit.

BACKGROUND OF THE INVENTION

Conventionally, puncture repair kits are known for repairing flat tires. For example, Japanese Unexamined Patent Application No. 2017-056662 (Patent Literature 1) has proposed a puncture repair kit for repairing a puncture by sequentially injecting a puncture repair liquid and compressed air into a punctured tire by using compressed air from a compressor.

SUMMARY OF THE INVENTION

However, since the puncture repair kit of the Patent Literature 1 injects compressed air after injecting the puncture repair liquid, a large amount of the puncture repair liquid is needed to be injected in order to seal the punctured area with the puncture repair liquid, and the time required for this process is also long.

The present disclosure was made in view of the above, and a primary object thereof is to provide a mixing device, a bottle unit, and a puncture repair kit for quick puncture repair.

The present disclosure is a mixing device for mixing a puncture repair liquid and compressed air including:
a mixing chamber;
a first inlet for supplying the compressed air to the mixing chamber;
a second inlet for supplying the puncture repair liquid to the mixing chamber; and
an outlet for discharging a mixture of the puncture repair liquid and the compressed air from the mixing chamber, wherein, the mixing chamber includes a deposition section for depositing agglomerates contained in the puncture repair liquid, and
the deposition section is provided between the second inlet and the outlet.

It is possible that the mixing device of the present disclosure repairs punctures in a short period of time by having the configuration described above.

DETAILED DESCRIPTION OF THE INVENTION

An embodiment of the present disclosure will now be described below in conjunction with accompanying drawings.

Figure 1:
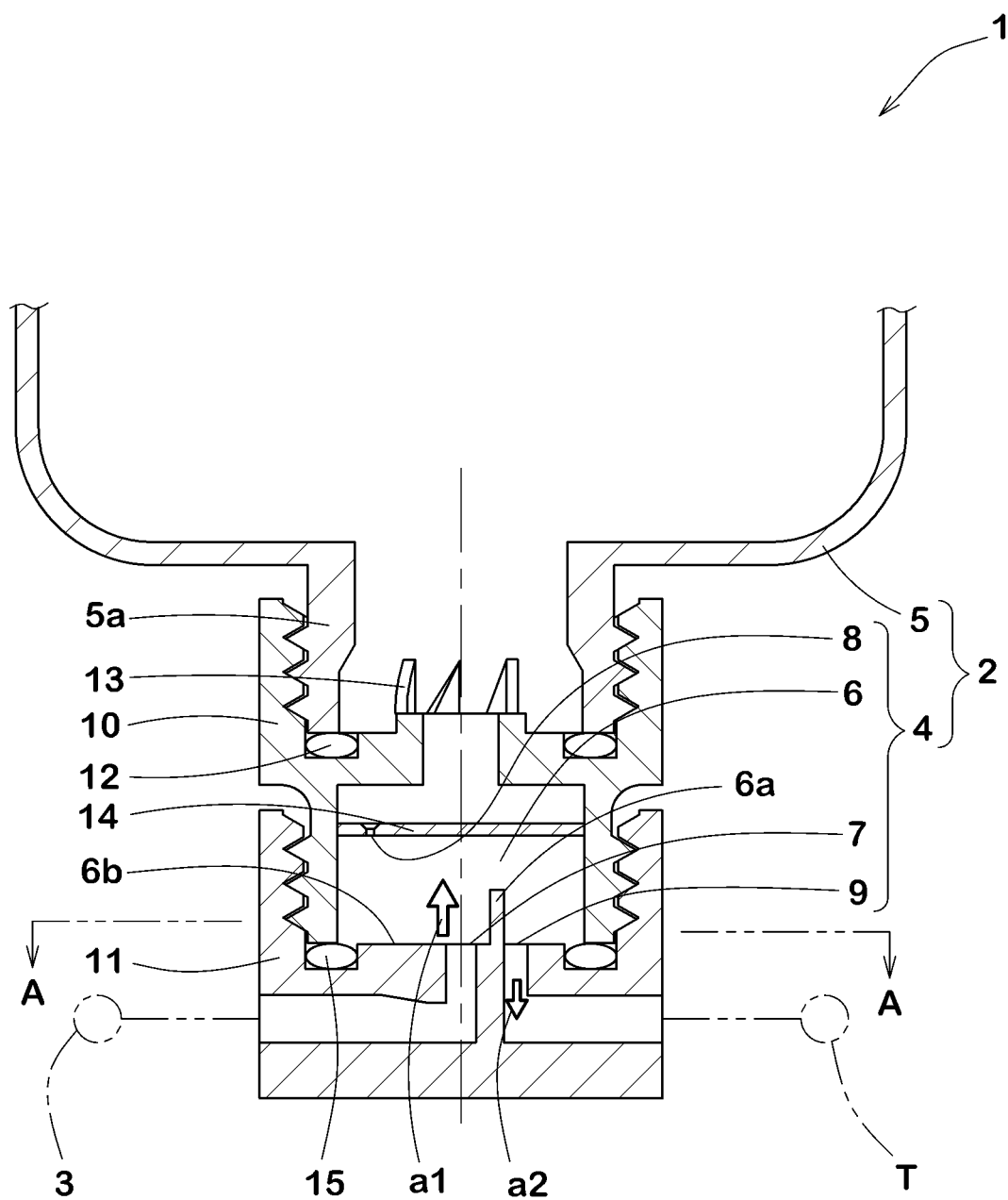
FIG. 1 is a cross-sectional view conceptually showing a puncture repair kit of the present disclosure.

FIG. 1 is a cross-sectional view conceptually showing a puncture repair kit 1 of the present embodiment. As shown in FIG. 1, puncture repair kit 1 is suitably used to supply a puncture repair liquid and compressed air to a punctured tire (T). The puncture repair kit 1 of the present embodiment includes a bottle unit 2 and a compressor 3 for supplying compressed air.

The bottle unit 2 of the present embodiment includes a mixing device 4 and a bottle container 5 containing a puncture repair liquid. The bottle container 5 has a mouth portion (5a) for receiving the puncture repair liquid into the bottle container 5, for example. It is preferred that the mixing device 4 is attached to the mouth portion (5a). FIG. 1 shows the upright position of the bottle container 5 with the mouth portion (5a) facing downwards.

The mixing device 4 is suitably used for mixing the puncture repair liquid and the compressed air. The mixing device 4 of the present embodiment has a mixing chamber 6, a first inlet 7 for supplying the compressed air to the mixing chamber 6, a second inlet 8 for supplying the puncture repair liquid to the mixing chamber 6, an outlet 9 for discharging a mixture of the puncture repair liquid and the compressed air from the mixing chamber 6. The mixing device 4 configured as such can drip the puncture repair liquid into the mixing chamber 6 as the mixing chamber 6 is repeatedly brought into positive and negative pressure states by the pulsation of the compressed air supplied from the compressor 3.

Figure 2:
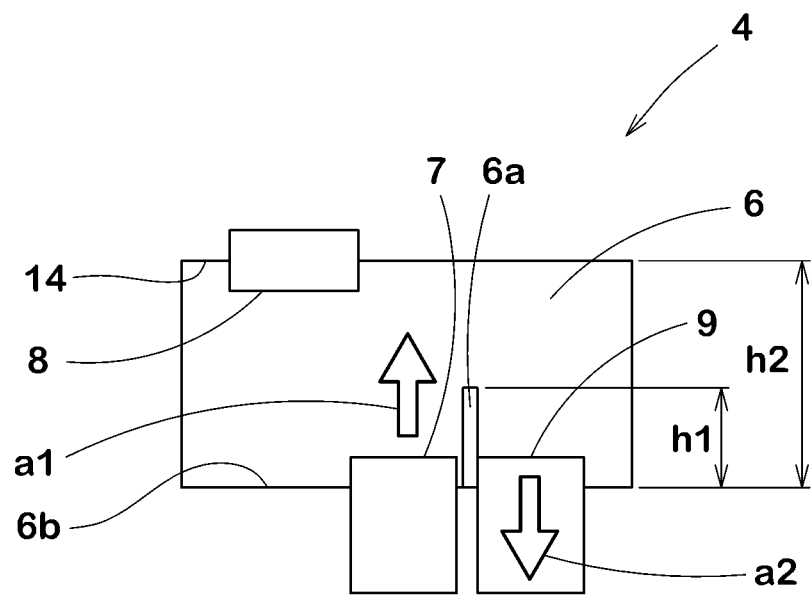
FIG. 2 is a schematic diagram of the mixing device of the present embodiment.

FIG. 2 is a schematic diagram of the mixing device 4 of the present embodiment in which the bottle container 5 is upright with the mouth portion (5a) facing downward. As shown in FIGS. 1 and 2, the mixing chamber 6 of the present embodiment includes a deposition section (6a) for depositing agglomerates (aggregates) contained in the puncture repair liquid. The deposition section (6a) of the present embodiment is formed between the second inlet 8 and the outlet 9.

It is possible that the mixing device 4 configured as such allows the agglomerates in the puncture repair liquid to deposit by allowing the puncture repair liquid dropped from the second inlet 8 to come into contact with the deposition section (6a) before the puncture repair liquid is stirred in the mixing chamber 6 and discharged from the outlet. Therefore, it is possible that the mixing device 4 of the present embodiment suppresses narrowing of the flow path due to the aggregates flowing into the outlet 9, allowing puncture repair to be performed in a short period of time.

In a more preferred form, the mixture is an aerosol of the puncture repair liquid and the compressed air. The puncture repair kit 1 configured as such can efficiently repair punctured areas with a small amount of the puncture repair liquid, and can reduce the effect on sound-absorbing materials, sensors, and the like, even if the tire (T) has the sound-absorbing materials, sensors, and the like inside the tire (T).

It is preferred that the puncture repair liquid contains at least glycol. Examples of glycols include ethylene glycol, 1,3-propanediol, propylene glycol, and the like, for example. The puncture repair liquid configured as such is suitable for efficiently repairing puncture areas, even when a small amount of the puncture repair liquid is injected as an aerosol into the punctured tire (T).

The first inlet 7 supplies the mixing chamber 6 with compressed air in a first flow direction (a1), for example. The outlet 9 discharges the mixture in a second flow direction (a2), for example. The first flow direction (a1) and the second flow direction (a2) in the present embodiment are parallel and opposite to each other. The mixing device 4 configured as such allows the compressed air to diffuse throughout the mixing chamber 6 and allows the puncture repair liquid and the compressed air to be uniformly mixed.

It is preferred that the deposition section (6a) is formed in the vicinity of the outlet 9. The deposition section (6a) configured as such can reliably deposit agglomerates contained in the puncture repair liquid, and thus can further suppress the flow of the agglomerates into the outlet 9.

The deposition section (6a) of the present embodiment protrudes toward inside of the mixing chamber 6 from a surface (6b) of the mixing chamber 6 with which the outlet 9 communicates. The deposition section (6a) is formed as a thin plate, for example. The deposition section (6a) configured as such can efficiently allow the agglomerates to deposit before flowing into the outlet 9.

As shown in FIG. 2, it is preferred that a protruding height (h1) of the deposition section (6a) from the surface (6b) is from 0.50 to 0.85 times a height (h2) of the mixing chamber 6 in a protruding direction of the deposition section (6a). Since the protruding height (h1) of the deposition section (6a) is 0.50 times or more the height (h2) of the mixing chamber 6, the aggregates contained in the puncture repair liquid can be reliably deposited, and the aggregates can be more reliably suppressed from flowing into the outlet 9. Since the protruding height (h1) of the deposition section (6a) is 0.85 times or less the height (h2) of the mixing chamber 6, the mixture of the compressed air and the puncture repair liquid can move smoothly in the mixing chamber 6, which is helpful for puncture repair in a short time.

Figure 3:
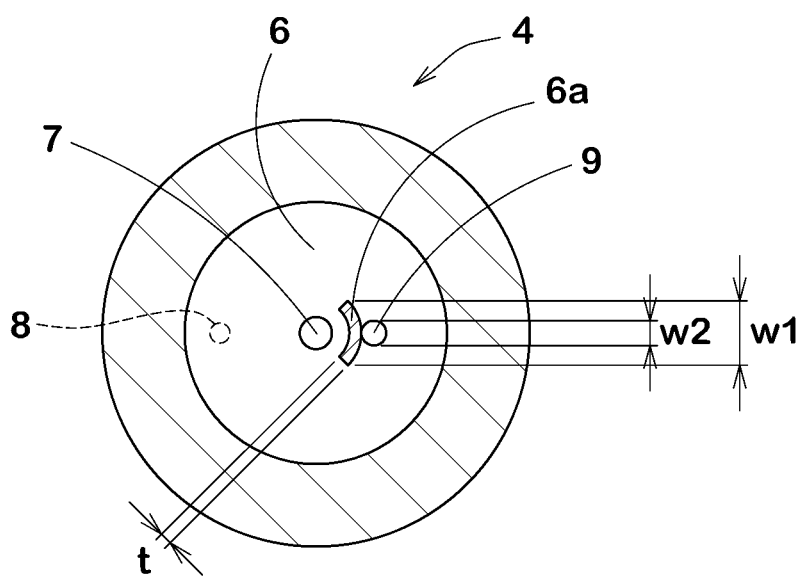
FIG. 3 is a cross-sectional view taken along A-A line of FIG. 1.

FIG. 3 is a cross-sectional view taken along A-A line of FIG. 1 with an indication of the second inlet 8 in a plan view. As shown in FIG. 3, the deposition section (6a) has a longitudinal cross-sectional shape in a cross section taken perpendicular to the protruding direction of the deposition section (6a) and it is preferred that a length (w1) of the deposition section (6a) in the longitudinal direction is from 1.6 to 3.0 times a maximum opening width (w2) of the outlet 9. In the present embodiment, as shown in FIG. 3, the length (w1) is measured in a direction linearly connecting both ends of the deposition section (6a), for example. Since the length (w1) of the deposition section (6a) is 1.6 times or more the maximum opening width (w2) of the outlet 9, the aggregates contained in the puncture repair liquid can be reliably deposited and the aggregates can be more reliably suppressed from flowing into the outlet 9. Since the length (w1) of the deposition section (6a) is 3.0 times or less the maximum opening width (w2) of the outlet 9, the mixture of the compressed air and the puncture repair liquid can move smoothly in the mixing chamber 6, which is helpful for puncture repair in a short time. As shown in FIG. 3, the deposition section (6a) is positioned between the second inlet 8 and the outlet 9 in the present embodiment.

It is preferred that the deposition section (6a) formed as a thin plate has a thickness (t) of 1.0 mm or more and 2.0 mm or less. It is possible that the deposition section (6a) configured as such suppresses the flow of agglomerates into the outlet 9 without impeding the smooth movement of the mixture of the compressed air and the puncture repair liquid in the mixing chamber 6. It should be noted that even though the deposition section (6a) is formed to have an arc-shaped cross section in FIG. 3, the deposition section (6a) is not limited to such a form and may be formed to have a linear cross section, that is, formed as a flat plate, for example.

As shown in FIG. 1, the mixing device 4 includes a first member 10 configured to be attached to the mouth portion (5a) of the bottle container 5 and a second member 11 configured to be attached to the first member 10, for example. It is preferred that the first member 10 is screwed onto the mouth portion (5a). The space between the first member and the mouth portion (5a) is sealed by a first sealing member 12, for example.

The first member 10 configured as such can be easily attached to the bottle container 5 and has excellent airtightness after attachment. It should be noted that the attachment of the first member 10 to the bottle container 5 is not limited to such a manner, and may employ an elastic body to prevent loosening, for example.

It is preferred that the first member 10 has a breaking portion 13 for breaking a film (not shown) for sealing the mouth portion (5a) of the bottle container 5 in a mint condition. The mixing device 4 configured as such can break the sealing of the bottle container 5 when the mixing device 4 is attached to the bottle container 5. Further, since the bottle container 5 is sealed with the film, the puncture repair liquid can be stored for a long period of time without deterioration.

The first member 10 of the present embodiment has a wall portion 14 provided with the second inlet 8. The wall portion 14 is formed as a thin plate, for example. The second inlet 8 is at least one through hole provided in the wall portion 14, for example. The wall portion 14 is not limited to such a form, and various forms can be adopted as long as the second inlet 8 is provided. The position of the wall portion 14 may be changeable, for example, depending on the conditions of use and the like. The first member 10 configured as such can change the size of the mixing chamber 6 by changing the position of the wall portion 14, which makes it easy to change the design.

It is preferred that the second member 11 is screwed to the first member 10. The space between the first member 10 and the second member 11 is sealed by a second sealing member 15, for example. The mixing chamber 6 consists of a combination of the first member 10 and the second member 11. Therefore, it is preferred that the first member 10 and the second member 11 are assembled in advance before the first member is attached to the bottle container 5. It should be noted that the attachment of the first member 10 and the second member 11 is not limited to such a mode, and a retaining structure and the like by using an elastic body may be adopted, and the first member 10 and the second member 11 may be press-fitted, bonded, or welded together in such a way that they cannot be disassembled, for example.

The second member 11 of the present embodiment has the surface (6b) provided with the first inlet 7, the outlet 9, and the deposition section (6a). It is preferred that the deposition section (6a) is formed between the first inlet 7 and the outlet 9. It is possible that the mixing device 4 configured as such efficiently mixes the puncture repair liquid and the compressed air as well as suppresses the flow of agglomerates contained in the puncture repair liquid into the outlet 9.

In the mixing device 4 of the present embodiment, the first inlet 7 and the outlet 9 are provided in a lower part of the mixing device 4, and the second inlet 8 is provided in an upper part of the mixing device 4 when the bottle container 5 is in an upright state with the mouth portion (5a) facing downward. The first inlet 7 is located in the center of the mixing chamber 6, for example. It is preferred that the second inlet 8 and the outlet 9 are located on both sides of the first inlet 7. The mixing device 4 configured as such serves for efficient mixing of the puncture repair liquid and the compressed air.

The first inlet 7 communicates with the mixing chamber 6 by a first opening area S1, for example. The second inlet 8 communicates with the mixing chamber 6 with a second opening area S2, for example. It is preferred that the first opening area S1 is from 1.5 to 15.5 times the second opening area S2. By setting the first opening area S1 to be from 1.5 to 15.5 times the second opening area S2, the ratio of the puncture repair liquid and the compressed air can be maintained within an appropriate range.

From this point of view, the first opening area S1 is more preferably from 1.5 to 13.0 times the second opening area S2, and even more preferably from 1.5 to 10.0 times the second opening area S2. It is possible that the mixing device 4 configured as such keeps the ratio of the puncture repair liquid and the compressed air in a more appropriate range.

It should be noted that the second inlet 8 may be multiple through holes provided in the wall portion 14, for example. In the present embodiment, when the second inlet 8 is a plurality of holes, the second opening area S2 is the sum of the opening areas of the holes.

The shape of the hole(s) of the second inlet 8 is not particularly limited, and can be appropriately selected from circular, elliptical, polygonal, and the like, for example. When the second inlet 8 is a plurality of holes, the shapes of the holes of the second inlet 8 may be all the same, or may be different for each hole, for example.

Figure 4:
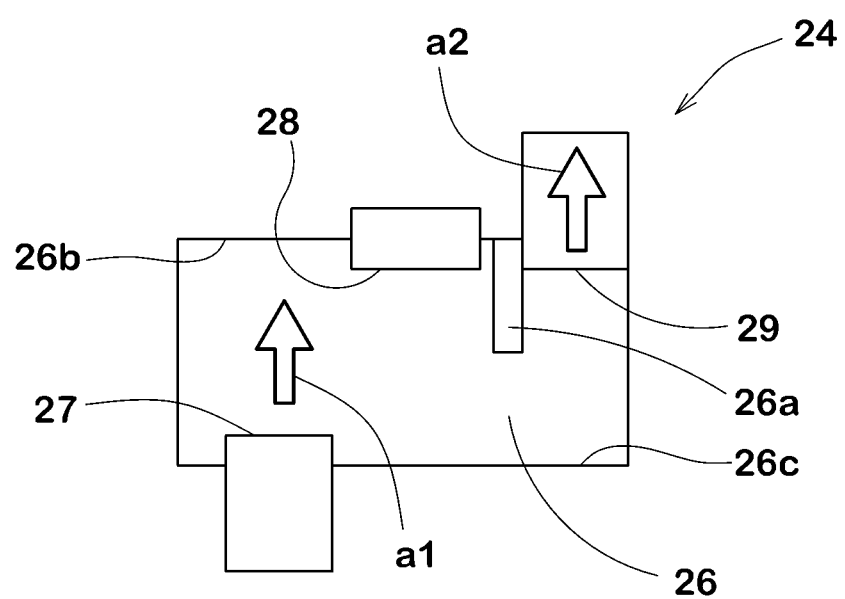
FIG. 4 is a schematic view of the mixing device according to the second embodiment.

FIG. 4 is a schematic diagram of a mixing device 24 of the second embodiment in the upright state of the bottle container 5 with the mouth portion (5a) facing downwards. As shown in FIG. 4, the mixing device 24 of the second embodiment has a mixing chamber 26, a first inlet 27, a second inlet 28, and an outlet 29. The functions and the like of the mixing chamber 26, the first inlet 27, the second inlet 28, and the outlet 29 are the same as those of the mixing chamber 6, the first inlet 7, the second inlet 8, and the outlet 9 described above, and the descriptions thereof are omitted. It should be noted that in the second embodiment, the second inlet 28 and the outlet 29 are formed in a surface (26b) and the first inlet 27 is formed in a wall portion (26c) of the mixing chamber 26.

The mixing chamber 26 of the second embodiment includes a deposition section (26a) for depositing agglomerates contained in the puncture repair liquid. The deposition section (26a) of the second embodiment is formed between the second inlet 28 and the outlet 29. In the mixing device 24, the first flow direction (a1) and the second flow direction (a2) are parallel to each other and have the same orientation. It is possible that the mixing device 24 configured as such smoothly discharges the compressed air while diffusing it in the mixing chamber 26, which is helpful for quick puncture repair.

It is preferred that the outlet 29 is positioned above the first inlet 27 in the upright state of the bottle container 5 (shown in FIG. 1) with the mouth portion (5a) facing downwards. The second inlet 28, the outlet 29, and the deposition section (26a) of the second embodiment are provided in an upper surface of the mixing chamber 26. The mixing device 24 configured as such can allow the agglomerates in the puncture repair liquid to deposit in a lower part of the mixing chamber 26 or in the deposition section (26a), and can more reliably suppress the flow of the agglomerates into the outlet 29.

Figure 5:
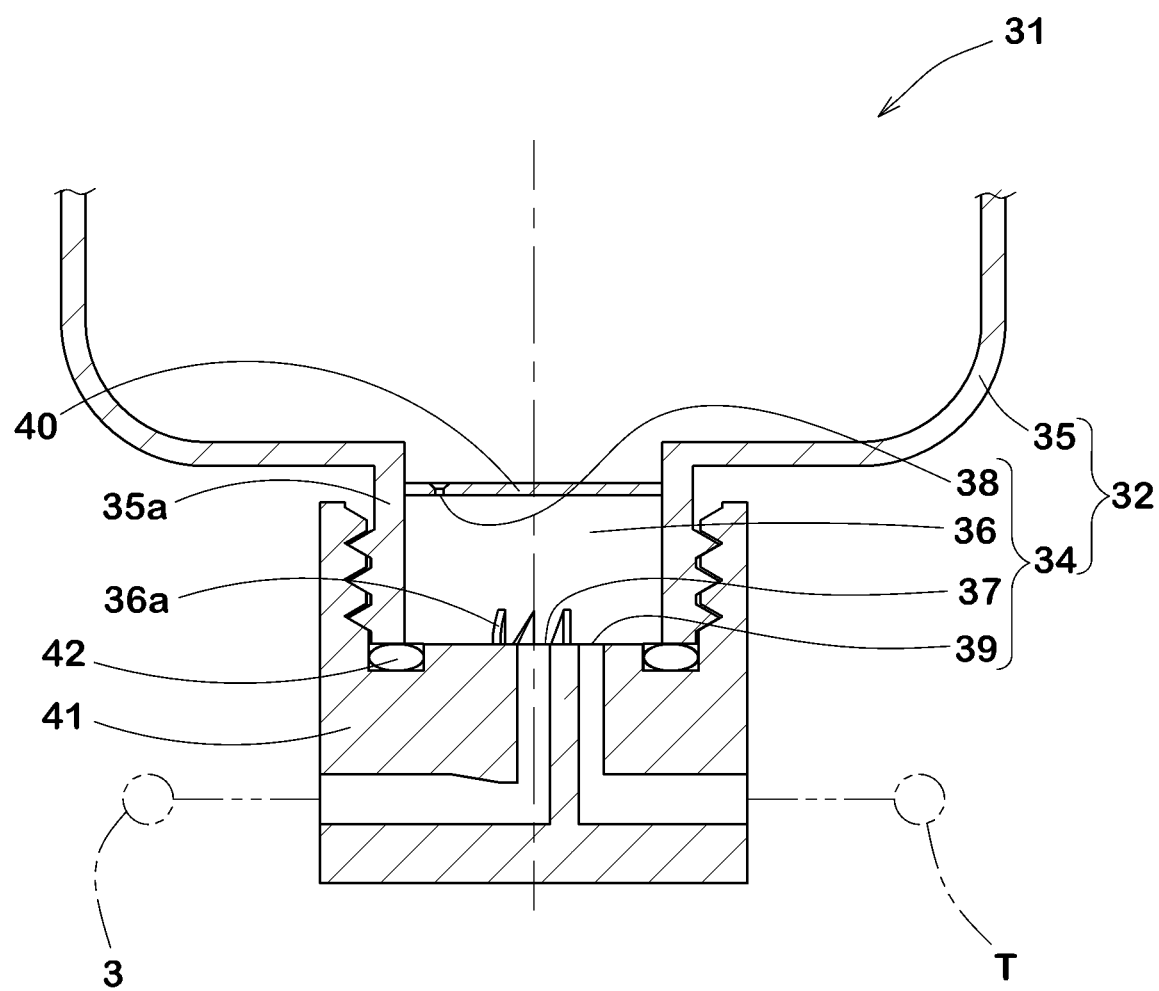
FIG. 5 is a cross-sectional view conceptually showing a puncture repair kit according to the third embodiment.

FIG. 5 is a cross-sectional view conceptually showing a puncture repair kit 31 of the third embodiment. As shown in FIG. 5, the puncture repair kit 31 of the third embodiment includes a bottle unit 32 and the compressor 3 for supplying compressed air.

The bottle unit 32 of the third embodiment includes, like the bottle unit 2 described above, a mixing device 34 and a bottle container 35 containing puncture repair liquid. The bottle container 35 has a mouth portion (35a) for receiving the puncture repair liquid into the bottle container 35, for example. It is preferred that the mixing device 34 is attached to the mouth portion (35a).

The mixing device 34 of the third embodiment is provided with a mixing chamber 36, a first inlet 37, a second inlet 38, and an outlet 39. The functions and the like of the mixing chamber 36, the first inlet 37, the second inlet 38, and the outlet 39 are the same as those of the mixing chamber 6, the first inlet 7, the second inlet 8, and the outlet 9 described above, and the descriptions thereof are omitted.

Like the mixing chamber 6 described above, the mixing chamber 36 of the third embodiment includes a deposition section (36a) for letting agglomerates contained in the puncture repair liquid to deposit. The deposition section (36a) of the third embodiment is formed between the second inlet 38 and the outlet 39, similar to the deposition section (26a) described above.

The mouth portion (35a) of the bottle container 35 according to the third embodiment has a wall portion 40 provided with the second inlet 38. The mixing device 34 of the third embodiment is formed inside the mouth portion (35a). That is, the wall portion 40 is a component of the mixing device 34, although it is provided inside the mouth portion (35a).

The mixing device 34 of the third embodiment includes a connecting member 41 attached to the mouth portion (35a) of the bottle container 35, for example. It is preferred that the connecting member 41 is screwed onto the mouth portion (35a). The space between the connecting member 41 and the mouth portion (35a) is sealed by a sealing member 42, for example.

The bottle container 35 has a film (not shown) for sealing the mouth portion (35a) in a mint condition, for example. The deposition section (36a) of the third embodiment has the function of breaking the film when the connecting member 41 is screwed onto the mouth portion (35a). The mixing device 34 configured as such can open the sealing of the bottle container 35 when the mixing device 34 is attached to the bottle container 35. Further, since the bottle container 35 is sealed with the film, the puncture repair liquid can be stored for a long period of time without deterioration.

It should be noted that in the puncture repair kit 31 of the third embodiment, the mixing chamber 36 may be filled with the puncture repair liquid during storage, but the puncture repair liquid in the mixing chamber 36 is discharged first by compressed air, and then the mixture of dripped puncture repair liquid and the compressed air can be produced.

While detailed description has been made of especially preferred embodiments of the present disclosure, the present disclosure can be embodied in various forms without being limited to the illustrated embodiments.

[Statement of Disclosure]
The present disclosure includes the following aspects.
[Present Disclosure 1]
A mixing device for mixing a puncture repair liquid and compressed air including:
a mixing chamber;
a first inlet for supplying the compressed air to the mixing chamber;
a second inlet for supplying the puncture repair liquid to the mixing chamber; and
an outlet for discharging a mixture of the puncture repair liquid and the compressed air from the mixing chamber, wherein, the mixing chamber includes a deposition section for depositing agglomerates contained in the puncture repair liquid, and
the deposition section is provided between the second inlet and the outlet.
[Present Disclosure 2]
The mixing device according to Present Disclosure 1, wherein the deposition section is formed in the vicinity of the outlet.
[Present Disclosure 3]
The mixing device according to Present Disclosure 1 or 2, wherein the mixing chamber has a surface with which the outlet communicates, and the deposition section protrudes from the surface of the mixing chamber toward inside of the mixing chamber.
[Present Disclosure 4]
The mixing device according to Present Disclosure 3, wherein a height of the deposition section from the surface in a protruding direction of the deposition section is from 0.50 to 0.85 times a height of the mixing chamber in the protruding direction.
[Present Disclosure 5]
The mixing device according to Present Disclosure 3 or 4, wherein
the deposition section has a longitudinal cross-sectional shape in a cross section thereof taken perpendicular to a protruding direction of the deposition section, and
a length of the deposition section in a longitudinal direction of the cross-section thereof is from 1.6 to 3.0 times a maximum opening width of the outlet.
[Present Disclosure 6]
The mixing device according to any one of Present Disclosures 1 to 5, wherein the mixture is an aerosol of the puncture repair liquid and the compressed air.
[Present Disclosure 7]
A bottle unit including the mixing device according to any one of Present Disclosures 1 to 6 and a bottle container, wherein
the bottle container contains the puncture repair liquid and has a mouth portion for receiving the puncture repair liquid, and
the mixing device is attached to the mouth portion.
[Present Disclosure 8]
The bottle unit according to Present Disclosure 7, wherein
the mouth portion has a film for keeping the puncture repair liquid airtight,
the mixing chamber has a surface with which the outlet communicates, and
the deposition section protrudes from the surface toward inside of the mixing chamber so as to break the film when the mixing device is attached to the mouth portion.

[Present Disclosure 9]
A puncture repair kit including the bottle unit according to Present Disclosure 7 or 8 and a compressor for supplying the compressed air.

DESCRIPTION OF REFERENCE SIGNS 4, 24, 34 mixing device
6, 26, 36 mixing chamber
6a, 26a, 36a deposition section
7, 27, 37 first inlet
8, 28, 38 second inlet
9, 29, 39 outlet

The invention claimed is:
1. A mixing device for mixing a puncture repair liquid and compressed air comprising:
a mixing chamber;
a first inlet for supplying the compressed air to the mixing chamber;
a second inlet for supplying the puncture repair liquid to the mixing chamber; and
an outlet for discharging a mixture of the puncture repair liquid and the compressed air from the mixing chamber, wherein, the mixing chamber includes a deposition section for depositing agglomerates contained in the puncture repair liquid, and
the deposition section is provided between the second inlet and the outlet.
2. The mixing device according to claim 1, wherein the deposition section is formed in the vicinity of the outlet.
3. The mixing device according to claim 1, wherein
the mixing chamber has a surface with which the outlet communicates, and
the deposition section protrudes from the surface of the mixing chamber toward inside of the mixing chamber.
4. The mixing device according to claim 3, wherein a height of the deposition section from the surface in a protruding direction of the deposition section is from 0.50 to 0.85 times a height of the mixing chamber in the protruding direction.
5. The mixing device according to claim 3, wherein
the deposition section has a longitudinal cross-sectional shape in a cross section thereof taken perpendicular to a protruding direction of the deposition section, and
a length of the deposition section in a longitudinal direction of the cross-section thereof is from 1.6 to 3.0 times a maximum opening width of the outlet.
6. The mixing device according to claim 5, wherein the deposition section is formed as a plate.
7. The mixing device according to claim 6, wherein the deposition section has a thickness of 1.0 mm or more and 2.0 mm or less.
8. The mixing device according to claim 6, wherein the deposition section has an arc-shaped cross section.
9. The mixing device according to claim 3, wherein
the mixing chamber has a wall portion opposing the surface, wherein
the first inlet is provided in the surface,
the second inlet is provided in the wall portion, and
the second inlet and the outlet are positioned on both sides of the first inlet with the first inlet therebetween in a plan view.

10. The mixing device according to claim 9, wherein
a first flow direction of the compressed air flowing through the first inlet into the mixing chamber and a second flow direction of the mixture discharged through the outlet are parallel and opposite to each other.

11. The mixing device according to claim 3, wherein
the mixing chamber has a wall portion opposing the surface, wherein
the first inlet is provided in the surface,
the second inlet is provided in the wall portion, and
the first inlet and the outlet are positioned on both sides of the second inlet with the second inlet therebetween.

12. The mixing device according to claim 11, wherein
a first flow direction of the compressed air flowing through the first inlet into the mixing chamber and a second flow direction of the mixture discharged through the outlet are parallel to each other and have the same orientation.

13. The mixing device according to claim 1, wherein the mixture is an aerosol of the puncture repair liquid and the compressed air.

14. A bottle unit comprising the mixing device according to claim 1 and a bottle container, wherein
the bottle container contains the puncture repair liquid and has a mouth portion for receiving the puncture repair liquid, and
the mixing device is attached to the mouth portion.

15. The bottle unit according to claim 14, wherein
the mouth portion has a film for keeping the puncture repair liquid airtight,
the mixing chamber has a surface with which the outlet communicates, and
the deposition section protrudes from the surface toward inside of the mixing chamber so as to break the film when the mixing device is attached to the mouth portion.

16. The bottle unit according to claim 15, wherein the deposition section is formed by a plurality of plates.

17. A puncture repair kit comprising the bottle unit according to claim 14 and a compressor for supplying the compressed air.

18. The bottle unit according to claim 14, wherein
the mixing device includes a wall portion provided with the second inlet, and
the wall portion is arranged in the mouth portion.

19. The mixing device according to claim 1, wherein the first inlet has an opening area of from 1.5 to 15.5 times an opening area of the second inlet.

20. The mixing device according to claim 1, wherein the second inlet is formed by a plurality of holes.

* * * * *